United States Patent [19]

Bailly et al.

[11] Patent Number: 5,137,996
[45] Date of Patent: Aug. 11, 1992

[54] ZIEGLER-NATTA CATALYST

[75] Inventors: Jean-Claude Bailly, Martigues; Louis Bordere, Marignane, both of France

[73] Assignee: BP Chemicals Limited, London, England

[21] Appl. No.: 694,270

[22] Filed: May 1, 1991

Related U.S. Application Data

[62] Division of Ser. No. 326,627, Mar. 21, 1989, Pat. No. 5,032,560.

Foreign Application Priority Data

[30] Mar. 31, 1988 [FR] France ............................ 88 04573

[51] Int. Cl.$^5$ .............................................. C08F 4/654
[52] U.S. Cl. .................................. 526/125; 526/351; 502/126; 502/127
[58] Field of Search ........................................... 526/125

[56] References Cited

U.S. PATENT DOCUMENTS

| | | | |
|---|---|---|---|
| 3,953,414 | 4/1976 | Galli et al. | 526/348 |
| 4,295,991 | 10/1981 | Wristers | 526/119 X |
| 4,326,988 | 4/1982 | Welch et al. | 526/125 X |
| 4,497,904 | 2/1985 | Blaya et al. | 526/125 X |
| 4,511,703 | 4/1985 | Bailly | 526/125 |
| 4,543,389 | 9/1985 | Burstain et al. | 525/53 |
| 4,960,741 | 10/1990 | Bailly et al. | 526/125 X |

FOREIGN PATENT DOCUMENTS

| | | |
|---|---|---|
| 99773 | 2/1984 | European Pat. Off. |
| 099774 | 2/1984 | European Pat. Off. |
| 238345 | 9/1987 | European Pat. Off. |

Primary Examiner—Patrick P. Garvin
Attorney, Agent, or Firm—Brooks Haidt Haffner & Delahunty

[57] ABSTRACT

A Zeigler-Natta type catalyst suitable for polymerizing propylene comprising a preactivated support coated with 0.1 to 10 g of homopolymer or copolymer of propylene. The preactivated support which comprises magnesium chloride and 1 to 20% by mol of an electron donor free from labile hydrogen and from ester function, is in the form of spherical particles having a mean diameter by mass of 10 to 100 microns and a ratio of the mean diameter by mass to the mean diameter by number of less than 2.0. The preactivated support is treated with at least one internal electron donor compound and coated by contacting the treated support with an alkyl aluminium halide and propylene, optionally together with ethylene and/or a $C_{4-8}$ alpha-olefin, in the absence of an external electron donor compound.

16 Claims, No Drawings

ZIEGLER-NATTA CATALYST

This application is a division of application Ser. No. 07/326,627 filed on Mar. 21, 1989, and now U.S. Pat. No. 5,032,560.

This invention relates to a catalyst used for the polymerisation or co-polymerisation of propylene. It is of the Ziegler-Natta type supported on spherical particles of magnesium chloride. The invention also includes the methods for preparing this catalyst.

It is known that the catalytic systems of the Ziegler-Natta type consist of a combination of a catalyst consisting of at least one transition metal compound such as titanium, and a co-catalyst consisting of at least one organometallic compound of a metal such as aluminium. It is also known that the properties of these catalysts can be greatly influenced by depositing the transition metal compound on a support consisting of a solid mineral compound such as magnesium chloride. In the technique used for preparing a supported catalyst, the properties of the support and the process for preparing the catalyst, which usually entails applying the transition metal compound to this support, are extremely important as regards the characteristics of the catalyst.

It is known from European patent Application EP-/A/0099 773, how to prepare a highly active catalyst supported on spherical particles consisting of pre-activated magnesium chloride containing an organic electron donor compound such as an ether. The preparation of this catalyst consists of treating the pre-activated support with an internal electron donor compound, such as an ester of an aromatic acid, then impregnating this support with titanium tetrachloride. Before using it, such a catalyst can be subjected to a pre-polymerisation stage which involves polymerising a small quantity of propylene in the presence of a co-catalyst, generally identical to that employed later in the catalytic system of polymerisation. It is known that in order to obtain a very active and very stereospecific catalytic system for the polymerisation of propylene, the co-catalyst used is generally a trialkyl aluminium complexed with an external electron donor compound which is an aromatic acid ester such as ethyl benzoate. However, it has been found that because of the very high activity of this catalytic system, it is difficult to control precisely the quantity of pre-polymerized propylene. Moreover, it is observed that this type of pre-polymerized catalyst can lose a part of its catalytic activity after a few day of storage at ambient temperature.

It has been found, however, that it is possible to prepare a coated catalyst having a very high activity and a very high stereospecificity in the polymerisation of propylene, and to avoid the difficulties quoted above. In particular, the catalyst described in this invention can be stored for a number of weeks at a temperature which can vary over a large range. After a long period of storage, the catalyst can retain a high polymerisation activity. It is suitable in particular for all industrial processes of polymerisation or co-polymerisation of propylene, either in the liquid or in the gaseous phase. It can be used, especially, in the form of a suspension in a liquid hydrocarbon or in the form of a dry powder.

The object of this invention is a catalyst of the Ziegler-natta type, suitable for the polymerisation or co-polymerisation of propylene; it consists of a pre-activated support formed from 80 to 99% by mol of magnesium chloride and 1-20% by mol of an organic electron donor compound $D_1$ free from a labile hydrogen, in the form of spherical particles having a mean diameter by mass of 10-100 microns and a size distribution such that the ratio of the mean diameter by mass, Dm, to the mean diameter by number, Dn, is less than 2, a pre-activated support which has been treated with at least one internal electron donor compound, $D_3$, preferably an ester of an aromatic acid, then with titanium tetrachloride, a catalyst characterised by the fact that the pre-activated support thus treated is placed in contact with an alkyl aluminum halide and propylene, possibly mixed with ethylene and/or a $C_{4-8}$ alpha-olefin, in the absence of an external electron donor compound, so as to form a coated catalyst containing 0.1 to 10 g of polypropylene or co-polymer of propylene with ethylene and/or a $C_{4-8}$ alpha-olefin containing less than 20% by mol of ethylene and/or a $C_{4-8}$ alpha-olefin per millimol of titanium.

According to this invention, the catalyst must have a special support based on magnesium chloride so that it has a relatively high titanium content and an extremely high activity in the polymerisation of propylene. This special support is said to be preactivated by an organic electron donor compound $D_1$ present in the magnesium chloride in a relatively significant amount. The organic electron donor compound $D_1$ is known as such or as a Lewis base, notably possessing a relatively weak complexing power compared with magnesium chloride. The compound $D_1$ is preferably a weak complexing agent, such as an ether, a sulphone, a sulphoxide, a thieother, an amine, an amide or a phosphine. It cannot be material that is susceptible to reaction with one of the products utilised in preparing the support, particularly with an alkyl magnesium. In particular, the compound $D_1$ is free from labile hydrogen and from ester function. For instance, the compound $D_1$ cannot be an electron donor compound selected from water, alchohols, phenols and esters. The organic electron donor compound $D_1$ is preferably an ether.

The preactivated support is characterised by the fact that it contains a relatively significant quantity of the organic electron donor compound $D_1$. The preactivated support consists of 80-99% by mol of magnesium chloride and 1-20% by mol of the compound $D_1$. Better still, it consists of 80-95% by mol of magnesium chloride and 5-20% by mol of the compound $D_1$. It has been found that the catalysts are most effective if the preactivated support is present in the form of a homogeneous compound comprising a magnesium chloride and the compound $D_1$, i.e. a composition in which the compound $D_1$ is uniformly distributed throughout the whole of the magnesium chloride particle, from the core to its periphery. It is found that in order to obtain such a preactivated support, it is advisable to prepare it using methods involving precipitation reactions, and not simply by effecting contact by, say, grinding.

It has also been found that the preactivated support produces very efficient catalysts that have a high titanium content, capable, in particularly, of resisting enormous growth stresses during polymerisation, if it has a substantially amorphous structure, i.e. a structure in which all form of crystallinity, notably determined with the aid of X-ray diffraction analysis, has substantially disappeared.

The preactivated support, moreover, is characterised by the fact that is consists of spherical particles with a mean diameter by mass of 10-100 microns, preferably 20-50 microns. The particles have a very narrow size distribution, such that the ratio Dm/Dn of the mean diameter by mass, Dm, to the mean diameter by number, Dn, is less than 2. More particularly, the size distribution of these particles can be extremely narrow such that the ratio Dm/Dn is 1.1 to 1.5; substantially no particles of diameter greater than 1.5 ×Dm or smaller than 0.6 ×Dm is noted. The size distribution can equally be appreciated by the fact that more than 90% by weight of the particles of the same batch is in the range Dm±10%. The specific surface of the particles of the preactivated support may be from 20 to 100 m²/g (BET), preferably 30 to 60 m²/g.

(BET), and the density of these particles may be about 1.2 to 2.1. The preactivated support used in this invention can be prepared by reacting a dialkyl magnesium compound with a chlorinated organic compound in the presence of the organic electron donor compound $D_1$. As the dialkyl magnesium compound, a product of the formula $R_1MgR_2$ can be used in which $R_1$ and $R_2$ are identical or different alkyl radicals containing 2 to 12 atoms of carbon. One of the important properties of this dialkyl magnesium compound is that it is soluble in the hydrocarbon medium in which the support will be prepared.

As the chlorinated organic compound, an alkyl chloride of the formula $R_3Cl$ in which $R_3$ is a secondary alkyl radical, or preferentially a tertiary alkyl radical comprising 3-12 atoms of carbon, is used. As the electron donor compound $D_1$, it is advisable to use an ether of the formula $R_4OR_5$ in which $R_4$ and $R_5$ are identical or different alkyl radicals containing 1-12 atoms of carbon.

Moreover, the various reagents used for preparing the preactivated support may be used under the following conditions:

The molar ratio $R_3Cl/R_1MgR_2$ is 1.5 to 2.5, preferably 1.95 to 2.2.

The molar ratio $D_1/R_1MgR_2$ is 0.1 to 1.2, preferably 0.3 to 0.8.

The reaction between $R_1MgR_2$ and $R_3Cl$, in the presence of the organic electron donor compound $D_1$, is a precipitation reaction which takes place in a stirred liquid hydrocarbon medium. The specialist knows that in this case (all else being equal), the physical factors such as the viscosity of the medium, the method and speed of stirring, and the conditions under which the reagents can be used, play an important role in the form, the structure, the size and the size distribution of the precipitated particles. However, to obtain the preactivated support used in this invention, and characterised particularly by a substantially amorphous structure, it is advisable to carry out the precipitation reaction at a relatively low temperature from 10° to 80° C. preferably from 10° to 50° C., and more preferably from 15° to 35° C. It is also advisable for the precipitation reaction to be carried out extremely slowly for at least two hours, preferably from 10 to 24 hours, so as to permit proper organisation of the amorphous solid product formed, in particular the application of a significant quantity of the compound $D_1$, and its uniform dispersion in the precipitated amorphous solid.

The preparation of the catalyst consists of subjecting the preactivated support thus defined to at least a treatment with an internal electron donor compound, $D_3$, preferably as aromatic acid ester and a treatment with titanium tetrachloride. These treatments enable the internal electron donor compound $D_3$ and the titanium tetrachloride to be fixed in the preactivated support in quantities such that the support contains:

0.5 to 20% preferably 1 to 12% by mol of the internal electron donor compound $D_3$ and 0.5 to 12% preferably 1 to 10% by mol of titanium per mol of magnesium According to this invention, the preactivated support thus treated is placed in contact with an alkyl aluminum halide and propylene, possibly mixed with ethylene and/or a $C_{4-8}$ alpha-olefin, in the absence of an electron donor compound, so as to form a coated catalyst containing 0.1 to 10 g of polypropylene or a co-polymer of propylene with ethylene and/or $C_{4-8}$ alpha-olefin containing less than 20% and preferably less than 10% by mol of ethylene and/or $C_{4-8}$ alpha-olefin per millimol of titanium. It has been found, surprisingly, that the catalyst coated in this way can be preserved under an inert atmosphere at a temperature not lower than ambient temperature, for several weeks and that after such a period of storage when used in combination with a conventional co-catalyst it has an extremely high activity and stereospecificity in the polymerisation of propylene.

The coating operation which consists of placing the treated support in contact with propylene, possibly mixed with ethylene and/or a $C_{4-8}$ alpha-olefin, must be carried out in the presence of an alkyl aluminium halide having the formula:

$$AlX_nR_{3-n}$$

in which X is a chlorine or bromine atom, R is an alkyl radical containing 1–8 atoms of carbon, and n is a whole number or fraction not less than 0.5 but less than 3, preferably equal to or greater than 1, and less than or equal to 2. The alkyl aluminium halide may consist of one or more organo-aluminium compounds whose general formula was given above. The alkyl aluminium halide is preferably the monochloride of diethyl aluminium, the sesquichloride of ethyl aluminium, or the monochloride of diisobutyl aluminium.

In addition, it has been found that it is essential to carry out the coating in the absence of an external electron donor compound, particularly in the absence of an aromatic acid ester used in combination with the cocatalyst. Thus, during the coating, the propylene possibly mixed with ethylene and/or a $C_{4-8}$ alpha-olefin is placed in contact solely with the treated support and the alkyl aluminium halide, used without the external electron donor compound. More particularly, the alkyl aluminium halide must be used in a form that has not been complexed by an external electron donor compound. It is quite surprising to note that the present coated catalysts is prepared in the presence of a catalyst system, comprising an alkyl aluminium halide but no external electron donor compound. Nevertheless, the coated catalyst thus obtained is able to produce in a further polymerisation a very stereospecific polypropylene.

The alkyl aluminium halide may be used in a quantity such that the atomic ratio Al/Ti is 0.1 to 20, preferably 0.5 to 10.

The coating operation is best effected in suspension in a liquid hydrocarbon medium, in particular in liquid propylene or in a liquid, saturated hydrocarbon, such as n-hexane or n-heptane, at a temperature of −20° C. to +80° C., preferably 0° C. to 65° C. The best results are obtained when the coating operation is carried out under conditions such that the rate of prepolymerisation (rp) is relatively slow, and is preferably lower than the rate of polymerisation or copolymerisation of propylene when the coated catalyst is ready to be used (RP), more preferably rp is lower than 0.1 ×RP and most preferably is lower than 0.2 ×RP. For instance, the rate of prepolymerisation, rp, during the coating operation, can be less than or equal to 25 g of olefin per hour and per millimol of titanium. The coating is stopped when the coated catalyst contains 0.1 to 10 g, preferably 1 to 8 g of polypropylene or propylene/ethylene and or $C_{4-8}$ alpha olefin copolymer per millimol of titanium.

The main aims of the coating carried out according to this invention are to carefully retain the spherical form of the preactivated support without changing its size distribution, and to produce a coated catalyst having beneficial and improved properties as regards the subsequent stages of polymerisation or copolymerisation of propylene. The beneficial and improved properties of the coated catalyst include, in particular, the excellent mechanical resistance, the remarkable resistance to abrasion and disintegration of the particles subjected to enormous growth stresses during the subsequent stages of polymerisation or co-polymerisation, a high bulk density of the polymers or co-polymers obtained, and the controlled activity, notably in the initial phase of polymerisation or co-polymerisation of propylene.

One of the most astonishing effects of this invention is the fact that the prepolymer or the pre-copolymer of propylene produced during the coating operation has a relatively crystalline character, and the resulting coated catalyst consists of non-sticky particles, i.e. an easily manageable free-flowing powder. In fact, it might be thought that during the coating of a catalyst supported on magnesium chloride, it would be necessary to use a co-catalyst known for its stereospecific properties in the polymerisation of propylene. Due attention would have to be paid to the fact that if an organoaluminium compound were not used in combination with an external electron donor compound, in particularly a trialkyl aluminium with an aromatic acid ester, the prepolymer or the pre-copolymer of propylene coating the catalyst would be expected to have a relatively amorphous structure, and consequently the coated catalyst would necessarily be sticky, and its activity in polymerisation reduced by occulation of the active sites in the amorphous parts produced. However, it has been found, surprisingly, that this does not occur and that the coated catalyst produced in the presence of an alkyl aluminium halide but without addition of an external electron donor compound, is not only non-sticky, but retains its very active and stereo-specific character for the subsequent polymerisation of propylene.

The catalyst according to this invention can be prepared in various ways, one of the preparation procedures consisting of three successive stages, as follows:

(a) treating the preactivated support with at least one internal electron donor compound $D_3$, preferably an ester of an aromatic acid, (b) impregnating the support thus obtained with titanium tetrachloride in a molar quantity in excess of the magnesium chloride, then removing the excess of titanium tetrachloride that has not been impregnated, by at least one washing with a liquid hydrocarbon, (c) placing the support thus impregnated in a liquid hydrocarbon medium in contact with an alkyl aluminium halide and propylene, possibly mixed with ethylene and/or a $C_{4-8}$ alpha olefin, in the absence of an external electron donor compound.

More particularly, in stage (a) the internal electron donor compound $D_3$ can be an aromatic acid ester, preferably selected from ethyl benzoate, methyl paratoluate and dibutyl phthalate or diisobutyl phthalate. The treatment with the internal electron donor compound $D_3$ is carried out under conditions such that the structure and the morphology of the support are not significantly changed. It is carried out, notably, by placing the support in contact with $D_3$ is an amount between 0.1 and 1 mol, preferably between 0.2 and 0.8 mol per mol of magnesium chloride. It is also advisable to carry out this contact process at a temperature of 10°-60° C., preferably 20°-50° C., so as not to significantly change the morphology of the support. It is advisable to carry out this contact process, with stirring, in the presence of a liquid hydrocarbon such as n-hexane. In practice, the contact process can be achieved in a number of ways, in particular by adding $D_3$ to the support suspension in a stirred liquid hydrocarbon. This support, thus treated can, if necessary, be washed one or more times with a liquid hydrocarbon such as n-hexane before passing to the next stage.

In stage (b) the support, treated with the internal electron donor compound $D_3$, is impregnated with titanium tetrachloride which can be used alone or in a liquid hydrocarbon such as n-hexane. This impregnation is carried out by placing the support in contact with titanium tetrachloride in an amount between 1 and 25 mol, preferably between 2 and 20 mol, per mol of magnesium chloride. In addition, it is advisable to carry out the impregnation at a temperature between 20° and 130° C., preferably between 70° and 120° C., to ensure that the support retains its particular structure which readily enables it to withstand high growth sresses during polymerisation. In addition, it is advisable to carry out this impregnation with stirring and in a liquid hydrocarbon medium such as n-hexane. In practice, the impregnation can be carried out in various ways, in particular by adding titanium tetrachloride to a stirred support suspension in a liquid hydrocarbon. The support, impregnated in this way, is preferably washed one or more times with a liquid hydrocarbon such as n-hexane in order to remove the excess of titanium tetrachloride that is not impregnated in the support, before proceeding to the following stage.

Stage (c) consists of the coating operation described above.

Another process for preparing the catalyst according to this invention may include the 5 successive stages;

(m) treating the preactivated support with at least one labile hydrogen-containing electron donor compound $D_2$, (n) treating the support obtained previously with at least one internal electron donor compound $D_3$, preferably an aromatic acid ester, (p) impregnating the support thus treated with titanium tetrachloride in a molar quanity in excess of the magnesium chloride, then removing the excess of the titanium tetrachloride not impregnated, by at least one washing with a liquid hydrocarbon, (q) subjecting the support, thus impregnated, to an activation treatment using titanium tetrachloride, then washing the support, thus treated, with a liquid hydrocarbon, and (r) placing the support, thus treated in a liquid hydrocarbon medium in contact with an alkyl aluminium halide and propylene, possibly mixed with ethylene and/or a $C_{4-8}$ alpha olefin, in the absence of an external electron donor compound.

In particularly, in stage (m), the preactivated support is treated with a labile hydrogen-containing electron donor compounds $D_2$ in order to obtain a suitable support for subsequently fixing a significant amount of titanium tetrachloride. This treatment actually consists of carrying out, in the presence of the preactivated support, an exchange between the organic electron donor compound $D_1$ and the labile hydrogen-containing electron donor compound $D_2$, under conditions such that this exchange is substantially complete, without appreciably modifying the structure of the support. In particular, the compound $D_2$ may have a complexing power vis a vis the magnesium chloride greater than that of the compound $D_1$.

The labile hydrogen-containing electron donor compound $D_2$ is best selected from the alcohols and the phenols. An alcohol containing 1 to 12 carbon atoms is used preferentially, more particularly, the compound $D_2$ is ethanol, propanol, n-butanol, n-pentanol or n-hexanol.

It is advisable to carry out this treatment without substantially producing a recrystallisation of the support or any disintegration of the particles. Specifically, it is effected by placing the preactivated support in contact with compound $D_2$ used in a quantity between 0.2 and 1.2 mol, preferably between 0.5 and 1.0 mol per mol of magnesium chloride. In addition, it is extremely advisable to carry out the contact process at a temperature of 0°-50° C., preferably 10°-35° C., in order to ensure that the exchange reaction takes place without significant modification of the initially preactivated support. Moreover, it is an advantage to carry out this contact process, with stirring, in the presence of a liquid hydrocarbon such as n-hexane, and this can be done in practice by placing it in contact by various means, for example by adding the compound $D_2$ to the stirred preactivated support suspension in a liquid hydrocarbon. In general, it can be seen that the major part or even the whole of the compound $D_2$ used in this treatment is fixed in the support and no substantial change in the amorphous structure and in the morphology of the support is evident. The support, thus treated with the compound $D_2$, can be washed once or more with a liquid hydrocarbon, such as n-hexane, before proceeding to the next stage.

Stage (n) is identical in every way to stage (a) described previously, except that instead of using the preactivated support, the support prepared in stage (m) is used.

Stage (p) is also identical to stage (b) described previously, except that instead of using the support prepared in stage (a), the support prepared in stage (n) is used. In stage (q), the support prepared in stage (p) is subjected to an activation treatment using titanium tetrachloride. This treatment consists of placing the solid, impregnated with titanium, in contact with titanium tetrachloride alone or in solution in a liquid hydrocarbon such as n-hexane. The quantity of titanium tetrachloride used in 1-25 mol, preferably 2-20 mol per mol of magnesium chloride. It is also advisable to carry out the contact process at a temperature of 20°-130° C., preferably 70°-120° C. It is a disable to carry out the activation stage, with stirring, in the presence of a liquid hydrocarbon such as an-hexane. In practice, the contact process can be carried out in various ways, in particular by adding titanium tetrachloride to the suspension of solid impregnated with titanium in a liquid hydrocarbon and by keeping the mixture thus obtained stirred for a period of 0.5-10 hours, preferably 1-4 hours. It is advisable to wash the solid, thus treated, once or more, with a liquid hydrocarbon such as n-hexane. The activation treatment may consist of one or more contact processes of this type. The support thus treated may contain 4 to 12% by mol of titanium per mol of magnesium.

Stage (r) consists of the support coating operation described above.

The coated catalyst, according to this invention, consists of particles whose spherical shape and size distribution are substantially identical to those of the particles of the initially preactivated support. These particles have a mean diameter by mass of between 10 to 150 microns, preferably between 20 and 70 microns.

The coated catalyst may be used in the polymerisation of propylene in combination with co-catalyst complexed with an external electron donor compound, in particular a trialkyl aluminium, possibly mixed with an alkyl aluminium halide, used with an ester of an aromatic acid. The molar ratio between this external electron donor compound and the organo-aluminium compound is at least 0.1 and at most 0.5, preferably about 0.3. An insufficient quantity of this external electron donor compound can reduce the stereospecificity of the catalytic system, while an excess can weaken the activity of the catalytic system. The relative molar quantities of the organo-aluminium compound with respect to the titanium compound used an vary within very wide limits; for example, the atomic ration Al/Ti in the polymerisation may vary from 1 to 200.

The coated catalyst can be used directly, such as in the polymerisation or copolymerisation of propylene. It may also be previously converted to a prepolymer of propylene or a mixture of propylene, ethylene and/or an olefin containing 4 to 8 atoms of carbon, with the aid of a co-catalyst complexed with an external electron donor compound identical to or different from that used in the polymerisation or copolymerisation of propylene. The prepolymer may be prepared in suspension in a liquid hydrocarbon medium such as liquid propylene or n-hexane, or even in the gaseous phase. In usually contains more than 10 g and less than 300 g of a polymer or copolymer of propylene per millimol of titanium.

An advantage of the present invention is that the coated catalyst can be stored for a number of weeks, at a temperature of $-30°$ C. to $+50°$ C., for example, without any weakening of the activity of the catalyst. Thus, such a coated catalyst can be transported over large distances whatever the climatic conditions. Also very high yields can be obtained when the coated catalyst of this invention is used for, the polymerisation or copolymerisation of propylene. Specifically, in the polymerisation of liquid propylene, the yield may be 15-20 kg of polymer per gramme of catalyst, even if the coated catalyst is stored for several weeks at ambient temperature or at a higher temperature in an inert atmosphere. The crystallinity of the polypropylene may be very high, since the boiling-heptane-insoluble content of the polymer is not less than 96%, 95% or 94% by weight, when the flow index ($FI_5/190$) of the propylene, measured at 190° C. under a weight of 5 kg, is respectively 2, 6, and 10 g/10 minutes.

It is also found that, thanks to the coated catalyst of the present invention, the development of each particle during the course of polymerisation of copolymerisation is regular, such that powders of polymer or copolymer obtained consist of spherical particles that are easily manageable and which have a high bulk density—usually between 0.40 and 0.50 g/cm$^3$ in the case of polypropylene.

The catalyst can be used for all processes of polymerisation, such as the processes in the gaseous phase, in suspension in liquid propylene, or in a hydrocarbon solvent.

Method for determining mean diameters by mass (Dm) and by number (Dn) of particles According to the invention, the mean diameters by mass (Dm) and by number (Dn) of support particles or catalyst particles, the determined by microscope, using the OPTOMAX image analyser (Micromeasurements Ltd. Great Britain). The measurement principle consists of obtain, from the experimental study (using the optical microscope) of a population of particles, a table of effects in which the number ($n_i$) of particles belonging to each class (i) of diameters, each class (i) being characterised by an intermediate diameter ($d_i$) between the limits of the said class. According to the homologous French standard (NF X 11-630 dated June 1981), Dm and Dn are obtained from the following formulae:

$$\text{mean diameter by mass: } Dm = \frac{\Sigma\, n_i(d_i)^3 d_i}{\Sigma\, n_i(d_i)^3}$$

$$\text{mean diameter by number: } Dn = \frac{\Sigma\, n_i \cdot d_i}{\Sigma\, n_i}$$

The ratio Dm/Dn defines the size distribution, sometimes called the size distribution range. The measurement by the OPTOMAX image analyser is carried out by means of an inverted microscope which enables the examination of suspension of support or catalyst particles with an enlargement of between 16 and 200 times. A television camera takes the images produced by the inverted microscope and transmits them to a computer that analyses the images received line by line and point by point on each line, in order to determine the dimensions or the diameters of the particles, and then classify them.

The following examples, which are not exhaustive, illustrative the invention.

EXAMPLE 1

Preparation of a pre-activated support

In an initial stage, 10.2 litres of a mixture containing 10 mol of dibutyl magnesium in n-hexane, 6.45 litres of n-hexane, and 1 litre of diisoamyl ether, are transferred, at ambient temperature (25° C.), under nitrogen, to a 30 litre stainless steel, double-walled reactor, fitted with a stirrer rotating at 600 rpm. In the second stage, in which the rate of stirring is maintained at 600 rpm, and the temperature of the reactor is kept at 25° C., 2.4 litres of tert-butyl chloride is added to the mixture thus obtained, at a uniform rate, over a period of 12 hours. At the end of this time, the reaction mixture is maintained at 25° C. for 3 hours. The precipitate obtained is washed with 15 litres of n-hexane. The precipitate is washed 6 times in these conditions. The solid product obtained constitutes the magnesium chloride based preactivated support containing 12% by mol of diisoamyl ether with respect to the magnesium chloride. In the microscopic examination, the preactivated support (A) is in the form of spherical particles having a mean diameter by mass of 21 microns, and an extremely narrow size distribution such that the ratio Dm/Dn of the particles is 1.4.

The specific surface area of the preactivated support (A) is about 45 m$^2$/g (BET). The structure of the magnesium chloride in the preactivated support is essentially amorphous.

EXAMPLE 2

Preparation of a coated catalyst

A suspension of the preactivated support (A), prepared as described in Example 1, containing 4 mol of magnesium chloride in 6 litres of n-hexane, is transferred, under nitrogen, to a 30 litre stainless steel reactor fitted with a stirrer rotating at 350 rpm. 18 litres of n-hexane is added to this suspension which is maintained at ambient temperature (25° C.). This is followed by 0.35 litre of n-butanol, added slowly, with stirring, over a period of 30 minutes. The suspension of the activated support thus obtained is maintained at 25° C. for 1 hour, with stirring. At the end of this time, the stirring is stopped and the activated support is allowed to settle. The supernatant liquid phase is removed and the activated support is resuspended in 6 litres of n-hexane, with stirring.

In a second stage, 10 litres of n-hexane is added, followed by a slow addition of 0.46 litre of ethyl benzoate, over a period of 30 minutes, to the activated support suspension. The support suspension treated in this way is stirred continuously for 1 hour at 25° C. At the end of this time, stirring is stopped, the treated support is allowed to settle, and the supernatant liquid phase is removed. The treated support is washed 3 times, each wash costing of 20 litres of n-hexane at 25° C., the suspension being stirred for 15 minutes, after which time the treated supported is allowed to settle for 20 minutes. The supernatant liquid is removed and the treaded support is resuspended in 6 litres of n-hexane. to the last suspension of the treated support maintained at 25° C., with stirring. The suspension thus obtained is heated to 100° C. and is kept stirred at this temperature for 2 hours. At the end of this time, the suspension of the support, thus impregnated, is cooled, with stirring, to 50° C.; this stirring is then stopped, and the impregnated support is allowed to settle; the supernatant liquid phase is removed, and the impregnated support is washed 3 times in succession, using 20 litres of n-hexane at 50° C. for each wash, then with two successive 20 litre washes of n-hexane at 25° C. The impregnated support is finally resuspended in 6 litres of n-hexane at 25° C. It consists of spherical particles containing 6% of titanium atoms per atom of magnesium.

In the fourth stage, 9 litres of titanium tetrachloride at 25° C. is added, with stirring, to the last suspension of impregnated support. The suspension thus obtained is heated to 100° C. and is kept stirred at this temperature for 2 hours. At the end of this time, the catalyst suspension thus obtained is cooled, with stirring, to 50° C.; the stirring is then stopped, and the catalyst is allowed to settle. The supernatant liquid phase is removed and the catalyst is washed successively 3 times using 20 litres of n-hexane at 50° C. each time, then washed successively 4 times with 20 litre portions of n-hexane at 25° C. The support, thus treated, is resuspended in 6 litres of n-hexane at 25° C., and contains 6.5% of titanium atoms per atom of magnesium and 4.5% by mol of ethyl benzoate per mol of magnesium chloride.

In a fifth stage, 2 litres of n-hexane, a quantity of the previously treated support, corresponding to 20 millimol of titanium, and 20 millimol of diethylaluminium monochloride (DEAC) are transferred, successively, at ambient temperature (25° C.), under nitrogen, to a 5 litre stainless steel reactor fitted with a stirrer rotating at 500 rpm. The reactor is heated to 50° C., and propylene is slowly added, at a uniform rate of 50 g/h, for 4 hours. At the end of this time, the suspension is kept stirred for another hour at 50° C., after which the coated catalyst is allowed to settle for 15 minutes. One litre of the supernatant liquid phase at 50° C. is removed, and the coated catalyst suspension is cooled to 25° C. and is washed twice with 1 litre portions of n-hexane at 25° C. The coated catalyst suspension (B) is thus recovered, and is stored at ambient temperature as a suspension in n-hexane.

The coated catalyst (B) is characterised by a polypropylene content of 6.5 g per millimol of titanium. It consists of spherical particles, of mean diameter by pass of 27 microns, and a size distribution such that the ratio Dm/Dm is 1.4. If the coated catalyst is isolated in the form of a dry powder, having removed that n-hexane, it is found that the powder can flow freely, and that it consists of non-sticky particles.

EXAMPLE 3

Preparation of a coated catalyst 500 ml of a suspension of the preactivated support (A) in n-hexane, prepared as described in Example 1, containing 0.2 mol of magnesium, is transferred, under nitrogen, to a 1 litre glass reactor fitted with a stirrer rotating at 250 rpm. After setting, the supernatant hydrocarbon phase is removed. The reactor is then heated to 50° C., and 2ml of ethyl benzoate is introduced. The stirred suspension is maintained at 50° C. for 2 hours.

In a second stage, 220 ml of titanium tetrachloride is transferred to the previous suspension at 50° C., with stirring. The temperature is then raised to 80° C. and this suspension is kept stirred at their temperature for 2 hours. The support, thus impregnated with titanium tetrachloride, is washed with n-hexane at 50° C. the support thus impregnated contains 1.4% of titanium atoms per atom of magnesium, and 1.6% by mol of ethyl benzoate per mol of magnesium chloride.

In a third stage, 2 litre of a nhexane, a quantity of the support previously impregnated with titanium, corresponding to 10 millimol of titanium, and 10 millimol of diethyl aluminum monochloride (DEAC) are transferred, at ambient temperature (25° C.), under nitrogen, to a 5 litre stainless steel reactor fitted with a stirrer rotating at 250 rpm. The reactor is heated to 50° C., and propylene is introduce slowly, at a uniform rate of 25 g/h, to the reactor. At the end of this time, the suspension is again kept stirred at 50° C. for another 30 minutes, and the coated catalyst is then allowed to settle for 15 minutes. 1 litre of the supernatant liquid phase at 50° C. is removed and the coated catalyst suspension is cooled to 25° C. It is washed twice with 0.5 litre portions of n-hexane at 25° C. The coated catalyst suspension (C) is thus obtained, and is stored at ambient temperature, suspended in n-hexane.

The coated catalyst (C) is characterised by a polypropylene content of 3.5 g per millimol of titanium. It consists of spherical particles, having a diameter by mass of 22 microns and a size distribution such that Dm/Dn is 1.4. If the coated catalyst is isolated in the form of a dry powder after removing the n-hexane it is found that the powder flows very freely and consists of non-sticky particles.

EXAMPLE 4

Preparation of a coated catalyst

The procedure is exactly as described in Example 2, except that in the fifth stage the reactor is heated to 30° C. instead of 50° C. The propylene is slowly added to the reactor at 30° C., at a uniform rate of 50 g/h, for 4 hours.

Under these conditions, a coated catalyst (D) is obtained which is characterised by a polypropylene content of 5 g per mmol of titanium. The coated catalyst consists of spherical particles having a mean diameter by mass of 23 microns, and a size distribution such that Dm/Dn is 1.4. When the coated catalyst is isolated in the form of a dry powder after removing the n-hexane, it is found that the powder is very free-flowing, and consists of non-sticky particles.

EXAMPLE 5

Preparation of a coated catalyst

The procedure of is exactly as described in Example 2, except that in the fifth stage the reactor is heated to 65° C. instead of 50° C. The propylene is slowly added to the reactor at 30° C. at a uniform rate of 50 g/h for 4 hours.

Under these conditions, a coated catalyst (E) is obtained which is characterised by a polypropylene content of 8.0 g per mmol of titanium. The coated catalyst consists of spherical particles having a mean diameter by mass of 29 microns, and a size distribution such that Dm/Dn is 1.4. When the coated catalyst is isolated in the form of a dry powder after removing the n-hexane, it is found that the powder is very free-flowing, and consists of non-sticky particles.

EXAMPLE 6

Preparation of a coated catalyst

The procedure is exactly as described in Example 2 except that, in the fifth stage, 100 mmol of DEAC instead of 20 mmol is transferred to the reactor.

Under these conditions, a coated catalyst (F) is obtained which is characterised by a proplypropylene content of 7.0 g per mmol of titanium. The coated catalyst consists of spherical particles having a mean diameter by mass of 27 microns, and a size distribution such that Dm/Dn is 1.4. When the coated catalyst is isolated in the form of a dry powder after removing the n-hexane, it is found that the powder is very free-flowing, and consists of non-sticky particles.

EXAMPLE 7 (comparative)

Preparation of a coated catalyst

The procedure is exactly as described in Example 2 except that, in the fifth stage, 20 mmol of triethyl aluminium (TEA) and 10 mmol of methyl paratoluate, instead of 20 mmol of DEAC, are transferred to the reactor.

Under these conditions, a coated catalyst (G) is obtained which is characterised by a polypropylene content of 9.5 g per mmol of titanium. The coated catalyst consists of spherical particles having a mean diameter by mass of 31 microns, and a size distribution such that Dm/Dn is 1.4.

EXAMPLE 8 (comparative)

Preparation of a coated catalyst

The procedure is exactly as described in Example 3 except that, in the third stage, 10 mmol of TEA and 5 mmol of methyl paratoluate, instead of 10 mmol of DEAC, are transferred to the reactor.

Under these conditions, a coated catalyst (H) is obtained which is characterised by a polypropylene content of 8.0 g per mmol of titanium. The coated catalyst consists of spherical particles having a mean diameter by mass of 29 microns, and a size distribution such that Dm/Dn is 1.4.

EXAMPLE 9

Polymerisation in liquid propylene

The coated catalysts, prepared as described in Examples 2 to 8, are kept in suspension in n-hexane, under nitrogen, at 25° C., for 1 month. At the end of this time, they are used for polymerisation in liquid propylene.

A mixture containing 0.626 mmol of triethyl aluminium, 0.313 mmol of diethyl aluminium chloride and 0.313 mmol of methyl paratoluate, a quantity of coated catalyst containing 0.01 mmol of titanium, a volume of hydrogen corresponding to a partial hydrogen pressure of 0.2 MPa, and 700 g of liquid propylene, is transferred, under nitrogen, at 5° C., to a 2.2 litre strainless steel reactor fitted with a stirrer rotating at 350 rpm. The reactor is heated to 70° C. At the end of 1.5 hours reaction, a polypropylene powder is obtained the characteristics of which are shown in Table 1 as a function of the coated catalysts used.

On analysing Table 1, it is found that the coated catalysts (B) and (C), according to this invention, used immediately after their preparation, or after storage for 1 month at 25° C., do not exhibit significant differences in activity and sterospecificity in the polymerisation of propylene. On the other hand, the coated catalysts (G) and (H), prepared in the presence of a trialkyl aluminium used, in the complexed state with an aromatic acid ester, exhibit significantly less activity in the polymerisation of propylene, after storage for 1 month at 25° C., compared with coated catalysts (B) and (C) respectively.

We claim:

1. A process for polymerising or copolymerising propylene in the presence of (a) an organoaluminium cocatalyst comprising a trialkylaluminium or a mixture of a trialkylaluminium and an alkylaluminium halide, (b) an external electron door compound, and (c) a coated catalyst based on a titanium chloride consisting of spherical particles having a mean diameter by mass from 10 to 150 microns and comprising per mmol of titanium from 0.1 to 10 g of a polypropylene or a propylene copolymer containing less than 20 mol % of ethylene and/or $C_{4-8}$ alpha-olefin, said coated catalyst being prepared by contacting:
   (1) a preactivated spherical support consisting of 80 to 99 mol % of magnesium chloride and 1 to 20 mol % of an organic electron donor compound D1 free from labile hydrogen and from ester function, with:
   (2) at least one internal electron donor compound D3,
   (3) titanium tetrachloride, and then with
   (4) propylene or a mixture of propylene with ethylene and/or $C_{4-8}$ alpha-olefin and an alkylaluminium halide in the absence of an external electron donor compound.

2. A process according to claim 1, characterised in that the polymerisation or copolymerisation of propylene is carried out in the presence of (a) the organoaluminium cocatalyst, (b) the external electron donor compound and (c) the coated catalyst in quantities such that the molar ratio of the external electron donor compound to the organoaluminium cocatalyst is 0.1 to 0.5 and such that the atomic ratio Al/Ti is 1 to 200.

3. A process according to claim 1, characterised in that the polymerisation or copolymerisation of propylene is carried out in a suspension in a liquid hydrocarbon or in a gas phase.

4. A process according to claim 1 characterised in that prior to the polymerisation of copolymerisation the coated catalyst is converted to a prepolymer prepared by contacting the coated catalyst with propylene or a mixture of propylene with ethylene and/or $C_{4-8}$ alpha-olefin in the presence of a cocatalyst and an external electron donor compound identical to or different from those used in the polymerisation or copolymerisation or propylene.

5. A process according to claim 4, characterised in that the prepolymer contains more than 10 g and less than 300 g of a propylene (co-)polymer per mmol of titanium.

6. A process according to claim 4, characterised in that the prepolymer is prepared in a suspension in a liquid hydrocarbon medium or in a gas phase.

7. A process according to claim 4, characterised in that the coated catalyst has a mean diameter by mass

TABLE 1

| | Characteristics of the polymers obtained | | | | | | | | |
|---|---|---|---|---|---|---|---|---|---|
| Coated Catalyst | B | B (1) | C | C (1) | D | E | F | G (comparative) | H (comparative) |
| Productivity (kg of polymer/ g of catalyst | 15.0 | 15.3 | 2.3 | 2.5 | 15.5 | 15.1 | 15.6 | 5.2 | 0.8 |
| Residual titanium content (ppm) | 1.5 | 1.5 | 3 | 2.5 | 1.5 | 1.5 | 1.5 | 4.5 | 9 |
| Insoluble polymer content in boiling n-hexane (% by wt.) | 95.9 | 95.9 | 94 | 94 | 96 | 95 | 95.5 | 93.5 | 93 |
| MI$_5$/$_{190}$ (g/10 min) | 6 | 5 | 3 | 3 | 5 | 6 | 5 | 3 | 3 |
| Bulk density (g/cm$^3$) | 0.4 | 0.4 | 0.4 | 0.4 | 0.4 | 0.4 | 0.4 | 0.4 | 0.4 |
| Mean diam. by mass Dm (micron) | 360 | 360 | 190 | 200 | 370 | 360 | 370 | 250 | 160 |
| Size distribution (Dm/Dn) | 1.5 | 1.5 | 1.5 | 1.5 | 1.6 | 1.5 | 1.5 | 1.6 | 1.6 |

(1) coated catalyst used after its preparation and after storage for 2 hours at 25° C. under nitrogen.

from 20 to 70 microns.

8. A process according to claim 11, characterised in that the coated catalyst has a narrow particle size distribution such that the ratio of the mean diameter by mass Dm to the mean diameter by number Dn is less than 2.

9. A process according to claim 1, characterised in that the organic electron donor compound D1 is selected amongst the group consisting of an ether, a sulphone, a sulphoxide, a thioether, an amine, an amide and a phosphine.

10. A process according to claim 1, characterised in that the internal electron donor compound $D_3$ is an ester of an aromatic carboxylic acid.

11. A process according to claim 1, characterised in that the alkylaluminium halide used for preparing the coated catalyst has a formula:

$$Al\ X_n\ R_{3-n}$$

in which X is a chlorine or bromine atom, R is an alkyl radical containing 1 to 8 atoms of carbon and n is a whole number or a fraction equal to or greater than 0.5 and less than 3.

12. A process according to claim 1, characterised in that the alkylaluminium halide used for preparing the coated catalyst is in a form non-complexed by an external electron donor compound.

13. A process according to claim 1, characterised in that the coated catalyst is prepared by:
  (a) treating the preactivated spherical support with the internal electron donor compound $D_3$,
  (b) impregnating the support thus obtained with titanium tetrachloride in an excess molar quantity with respect to the magnesium chloride, then removing the excess of non-impregnated titanium tetrachloride by at least one wash with a liquid hydrocarbon, and
  (c) bringing the support, thus impregnated, in a liquid hydrocarbon medium into contact with the alkylaluminium halide and with propylene or a mixture of propylene with ethylene and/or $C_{4-8}$ alpha-olefin, in the absence of an external electron donor compound.

14. A process according to claim 1, characterised in that the coated catalyst is prepared by:
  (m) treating the preactivated support with at least one electron donor compound $D_2$ containing a labile hydrogen,
  (n) treating the support, thus obtained, with the internal electron donor compound $D_3$,
  (p) impregnating the support, thus treated, with titanium tetrachloride, in a molar quantity in excess with respect to the magnesium chloride, then removing the excess of non-impregnated titanium tetrachloride by at least one wash with a liquid hydrocarbon.
  (q) subjecting the support, thus impregnated, to an activation treatment with titanium tetrachloride used in a molar quantity in excess with respect to the magnesium chloride, then washing the support, thus treated, with a liquid hydrocarbon, and
  (r) bringing the support, thus treated, in a liquid hydrocarbon medium into contact with the alkylaluminium halide and with propylene or a mixture of propylene with ethylene and/or a $C_{4-8}$ alpha-olefin in the absence of an external electron donor compound.

15. A process according to claim 1, wherein (i) the organoaluminium cocatalyst is triethylaluminum or diethylaluminium chloride or a mixture of same; (ii) the spherical particles have a mean diameter by mass of from 10 to 75 microns and the ratio of the mean diameter by mass $D_m$ to the mean diameter by number $D_n$ is less than 2; (iii) the external electron donor is an ester of an aromatic carboxylic acid; (iv) the preactivated spherical support consists of 80–95 mol % of magnesium chloride and 5 to 20 mol % of an organic donor compound D1 which is an ether; and (v) said internal electron donor compound D3 is an aromatic carboxylic ester.

16. A process according to claim 15, wherein the internal electron donor D3 comprises ethyl benzoate, methyl paratoluate, dibutyl phthalate or diisobutyl phthalate.

UNITED STATES PATENT AND TRADEMARK OFFICE
CERTIFICATE OF CORRECTION

PATENT NO. : 5,137,996

DATED : August 11, 1992

INVENTOR(S) : JEAN-CLAUDE BAILLY et al

It is certified that error appears in the above-identified patent and that said Letters Patent is hereby corrected as shown below:

Column 1, line 66, "-natta" should read -- -Natta --.

Column 2, line 33, insert --a-- between "be" and "material"; line 60, "in particularly" should read --in particular--.

Column 3, line 66, "as" should read --an--.

Column 4, line 40, change "sesquichioride" to --sesquichloride--; line 54, change "catalysts" to --catalyst--.

Column 6, line 11, change "is" to --in--.

Column 7, line 4, "particularly" should read --particular--.

Column 8, line 31, "an" should be --can--; line 44, "In" should be --It--.

Column 9, line 18, "obtain" should read --obtaining--.

Column 10, line 37, change "supported" to --support--; line 38, change "treaded" to --treated--; line 39, before "to the last", insert --In a third stage, 6 litres of titanium tetrachloride is added--.

Column 11, line 20, "pass" should be --mass--; line 23, "that" should be --the--; line 33, "setting" should be --settling--; line 40, "their" should be --this--; line 42, "the" should be --The--; line 46, "of a nhexane" should be --of n-hexane--.

UNITED STATES PATENT AND TRADEMARK OFFICE
CERTIFICATE OF CORRECTION

PATENT NO. : 5,137,996
DATED : August 11, 1992
INVENTOR(S) : JEAN-CLAUDE BAILLY et al It is certified that error appears in the above-identified patent and that said Letters Patent is hereby corrected as shown below:

Column 12, line 46, "proplypropylene" should read --polypropylene--.
Column 14:
Claim 7, line 1, "claim 4" should read --claim 1--;
Claim 8, line 1, "claim 11" should read --claim 1--.

Signed and Sealed this

Twelfth Day of October, 1993

*Attest:*

BRUCE LEHMAN

*Attesting Officer*     *Commissioner of Patents and Trademarks*